United States Patent [19]

Tsunashima

[11] Patent Number: 5,072,315
[45] Date of Patent: Dec. 10, 1991

[54] TIME AXIS CORRECTING DEVICE

[75] Inventor: Kenji Tsunashima, Nagaokakyo, Japan

[73] Assignee: Mitsubishi Denki Kabushiki Kaisha, Tokyo, Japan

[21] Appl. No.: 233,253

[22] Filed: Aug. 16, 1988

[30] Foreign Application Priority Data

Aug. 18, 1987 [JP] Japan .................. 62-205516

[51] Int. Cl.$^5$ .............................................. H04N 5/91
[52] U.S. Cl. .................................... 360/36.2; 358/339
[58] Field of Search ................. 358/19, 326, 320, 337, 358/339, 148, 150; 360/36.1, 36.2

[56] References Cited

U.S. PATENT DOCUMENTS

| 4,212,027 | 7/1980 | Lemoine . | |
|---|---|---|---|
| 4,291,332 | 9/1981 | Kato et al. . | |
| 4,404,583 | 9/1983 | Tatami . | |
| 4,438,456 | 3/1984 | Yoshinaka . | |
| 4,443,821 | 4/1984 | Kate | 358/326 |
| 4,675,724 | 6/1987 | Wagner | 358/19 |
| 4,688,081 | 8/1987 | Furuhata et al. | 358/326 X |
| 4,714,954 | 12/1987 | Yoshinaka et al. | 358/326 X |
| 4,719,505 | 1/1988 | Katznelson | 358/19 |
| 4,780,770 | 10/1988 | Wagner | 358/326 X |

FOREIGN PATENT DOCUMENTS 0166428 1/1986 European Pat. Off. .
0217647 4/1987 European Pat. Off. .
58-124385 7/1983 Japan .

OTHER PUBLICATIONS

"VTR Gijutsu (VTR Technology)" p. 118, edited by Nippon Hoso Shuppan Kyokai.

Primary Examiner—Roy N. Envall, Jr.
Assistant Examiner—W. R. Young

[57] ABSTRACT

A time axis correcting device for removing change in time axis in an input video signal includes a video signal memory unit; a write-in control unit operable in response to a sampling command signal to write the input video signal in the video signal memory unit at a write-in timing conforming to the change in time axis in the input video signal; a read-out control unit for reading out the video signal from the video signal memory unit at a predetermined read-out timing; a read-only memory for storing a sampling data of a sine wave; a reference signal sampling circuit for sampling the reference signal from the input video signal; an address control unit for calculating the difference in phase between a sampling point and a reference position for the sampling point according to a sampling value of the reference signal sampled from the input video signal and also for addressing the read-only memory according to the difference in phase to cause the read-only memory to output a corrected reference signal; and a signal converter for converting the corrected reference signal into the sampling command signal.

18 Claims, 3 Drawing Sheets

TIME AXIS CORRECTING DEVICE

BACKGROUND OF THE INVENTION

1. Field of the Invention

The present invention generally relates to a time axis correcting device for use in a video tape player or the like, for minimizing or substantially eliminating change in time axis that is caused in a video signal as a result of a change in speed.

2. Description of the Background Art

FIG. 3 of the accompanying drawings illustrates a prior art time axis correcting device in a block circuit representation. This prior art time axis correcting device is disclosed in "VTR Gijutsu (VTR Technology)", page 118, edited by Nippon Hoso Shuppan Kyokai and comprises an analog-to-digital (A/D) converter 1, a memory unit 2, a digital-to-analog (D/A) converter 3, a write-in clock generator 4 and a read-out clock generator 5.

This prior art time axis correcting device operates in the following manner. Assuming that a video signal having its time axis varying is inputted to the write-in clock generator 4, the write-in clock generator 4 outputs a write-in clock signal conforming to the change in time axis. The write-in signal emerging from the write-in clock generator 4 is in turn applied to the analog-to-digital converter 1 which functions to sample the input video signal and converts the input video signal into a PCM signal, the sampled value being subsequently stored in the memory unit 2. On the other hand, in the read-out clock generator 5, a clock signal necessary to read out data from the memory unit 2 in synchronism with a reference synchronizing signal applied thereto from an external terminal 12 is synthesized. Therefore, in synchronism with the read-out clock signal generated from the read-out clock generator 5, the data stored in the memory unit 2 can be read out therefrom and is in turn supplied to the digital-to-analog converter 3 for the conversion of the data into an analog signal.

By the process described above, the change in time axis can be substantially removed from the input video signal and an output video signal having its time axis stabilized in synchronism with the external reference signal can be obtained.

The write-in clock generator referred to above is available in numerous models. For example, Japanese Laid-open Patent Publication No. 58-124385, published in 1983, discloses a write-in clock generator of a type wherein means is provided for detecting, and responding at a high speed to, change in time axis in dependence on a burst signal contained in the input video signal.

FIG. 4 illustrates a waveform used to explain the principle of detection of a deviation of sampling points resulting from the change in time axis. Referring to FIG. 4, if the cycle of a sine wave represented by the burst signal is four times the sampling cycle, the sampling of the burst signal will give four sampling points per cycle as shown. Assuming that the sampling points shown in FIG. 4 have respective levels expressed by X1, X2, X3 and X4, the following relationships can be established:

$X1 = B + A \cdot \sin \theta$ $X2 = B + A \cdot \sin (\theta + 90°) = B + A \cdot \cos \theta$ $X3 = B + A \cdot \sin (\theta + 180°) = B - A \cdot \sin \theta$ $X4 = B + A \cdot \sin (\theta + 270°) = B - A \cdot \cos \theta$ wherein A represents the amplitude of the burst signal, B represents the direct current level of the burst signal and $\theta$ represents the phase of the sampling point corresponding to the level X1 of the sampling point. Accordingly, $X1 - X3 = 2A \cdot \sin \theta$, and $X2 - X4 = 2A \cdot \cos \theta$ and, therefore, the phase $\theta$ of the sampling point can be determined from the four sampling points as expressed by the following equation:

$\theta = \tan^{-1}(X1 - X3)/(X2 - X4)$.

If $\theta = 0$ is taken as the reference to the sampling point, the calculation of the phase $\theta$ of the sampling point can provide an indication of the deviation (phase difference) of the sampling point from the reference point. In view of this, by varying the phase of the sampling clock signal (sampling command signal) according to the calculated phase $\theta$ (phase difference) of the sampling point, the write-in clock can be obtained which corresponds to change in time axis.

The above mentioned patent publication also discloses a phase modulating means as a means for varying the phase of the sampling clock signal. This phase modulating means is reproduced in FIG. 5 in a block circuit representation. Referring now to FIG. 5, the phase modulating means includes delay elements 34, 35, 36, 37, 38 and 39, each of the delay elements 34 to 36 having a delay amount equal to ¼ of the cycle of the sampling clock signal while each of the delay elements 37 to 39 has a delay amount equal to 1/16 of the cycle of the sampling clock signal. The phase modulating means disclosed therein also includes data selectors 31 and 32 and a buffer amplifier 33.

In the above described phase modulating means, the delay elements 34 to 36 weighted to have a delay amount equal to ¼ of the cycle of the sampling clock signal are connected in series with each other with input and output terminals of each delay elements 34 to 36 connected to input terminals of the data selector 31, and similarly, the delay elements 37 to 39 weighted to have a delay amount equal to 1/16 of the cycle of the sampling clock signal are connected in series with each other with input and output terminals of each of the delay elements 37 to 39 connected to input terminals of the data selector 32. A reference clock signal is applied to an input of the phase modulating means through the buffer amplifier 33. This phase modulating means is so designed that a data corresponding to the amount of delay of the clock signal determined in reference to the phase $\theta$ of the sampling point so calculated by the above described method is applied, as a fine time axis error signal, to the data selectors 31 and 32 thereby to modulate the phase of the sampling clock signal.

In the prior art time axis correcting device of the construction described hereinabove, the circuit shown in and described with reference to FIG. 5 has been employed as a sampling clock modulating means capable of responding at high speed to the change in time axis contained in the input video signal. The use of the sampling clock modulating means of the type discussed above has a problem in that the amounts of delay exhibited by the data selectors 31 and 32 must be exactly matched with the delay characteristics of the delay elements 34 to 39, requiring time-consuming and cumbersome adjustment.

SUMMARY OF THE INVENTION

Accordingly, the present invention has been devised with a view to substantially eliminating the above discussed problems inherent in the prior art time axis correcting device and has for its primary object to provide an improved time axis correcting device of a type wherein the clock phase modulating means used to vary the phase of the sampling clock signal does not require any adjustment of the phase modulation and is rendered highly precise.

The time axis correcting device herein provided in accordance with the present invention is operable to substantially remove the change in time axis in the input video signal and, for this purpose, comprises a video signal storage means; a write-in control means operable in response to a sampling command signal to write the input video signal in the video signal storage means at a write-in timing conforming to the change in time axis in the input video signal; a read-out control means for reading out the video signal from the video signal storage means at a predetermined read-out timing; a waveform storage means for storing sampling data obtained by sampling a sine wave at predetermined intervals; a reference signal sampling means for sampling the reference signal from the input video signal; an address control means for calculating the difference in phase between a sampling point and a reference position for the sampling point according to a sampling value of the reference signal sampled from the input video signal and also for addressing the waveform storage means according to the difference in phase to cause the waveform storage means to output the sampling data of the sine wave; and a signal converting means for converting the sampling data of the sine wave into the sampling command signal.

Preferably, the time axis correcting device according to the present invention may include a sync separator circuit operable to separate a horizontal synchronizing signal from the input video signal so that the horizontal synchronizing signal can be applied to the reference signal sampling means to allow the latter to sample the reference signal at predetermined intervals from the horizontal synchronizing signal.

Preferably, the horizontal synchronizing signal may be used as a reset signal for resetting the write-in control means, and the reference signal may be a color burst signal.

Preferably, the address control means may comprise a calculating circuit for calculating the difference in phase and for providing a phase difference signal indicative of the difference in phase, an address generator for generating a reference address signal, and an adder for summing the phase difference signal from the calculating circuit and the reference address signal together to provide an address signal to be applied to the waveform storage means. The waveform storage means may preferably comprises a read-only memory.

According to the present invention, the amount of modulation in phase of the sampling clock signal can be calculated from the sampling value of the reference signal in the input video signal, and the sampling data of the sine wave can be read out from a read-only memory according to the calculated value. The sampling data of the sine wave is subsequently converted to provide the sampling command signal having its phase modulated. The sampling command signal so obtained is highly precisely modulated in phase with no adjustment substantially effected thereto, and therefore, a highly stabilized operation can be appreciated.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENTS

Figure 1:
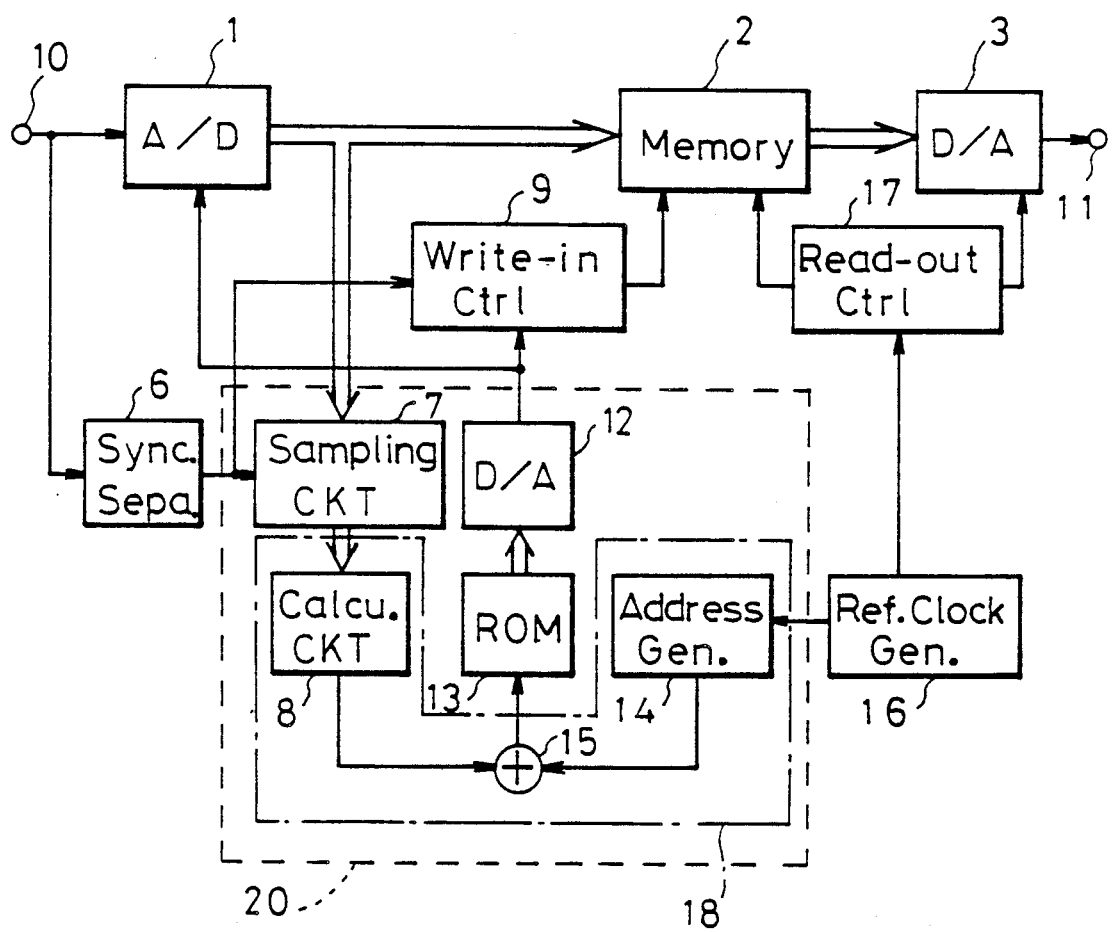
FIG. 1 is a block circuit diagram of a time axis correcting device according to a preferred embodiment of the present invention.

Referring now to FIG. 1, the analog-to-digital (A/D) converter 1 shown therein is adapted to convert into digital data the video signal with varying time axis inputted thereto through an input terminal 10. The digital data converted by and outputted from the analog-to-digital converter 1 is subsequently stored in the digital memory unit 2. The digital-to-analog (D/A) converter 3 connected to the digital memory unit 2 is used to output, from an output terminal 11, a video signal having its time axis corrected, that is, a video signal from which variation in time axis has been substantially removed. A synchronizing signal contained in the input video signal, that is, the video signal applied to the input terminal 10, is separated from the input video signal by a sync separating circuit 6.

The synchronizing signal separated by the sync separating circuit 6 from the input video signal as hereinabove described is supplied to a clock phase modulating means. This clock phase modulating means is comprised of a burst sampling circuit 7 for extracting, and applying to a calculating circuit 8, a predetermined reference signal which is, for the purpose of time axis correction, inserted in the input video signal emerging from the analog-to-digital converter 1, that is, a data representative of a burst signal component. It is to be noted that, so far as the input video signal is based on the NTSC scheme, the burst signal component may be a color burst signal. The calculating circuit 8 connected with the burst sampling circuit 7 is operable to calculate the difference in phase.

A write-in control circuit 9 is operable to control a write-in operation of the digital memory unit 2 and is connected with a digital-to-analog (D/A) converter 12 which outputs to the write-in control circuit 9 a clock signal (a sampling command signal) having its phase modulated by the phase difference calculated by the calculating circuit 8. Connected to the digital-to-analog converter 12 is a read-only memory (ROM) 13 in which sampling values of a sine wave are stored. Reference numeral 14 represents an address generator for generating a reference address signal to be applied to the read-only memory 13 through an adder 15 which is also adapted to receive the output from the calculating circuit 8. Connected to the address generator 14 is a reference clock generator 16 connected not only with the address generator 14, but also with a read-out control circuit 17 operable to control the reading of the data out from the digital memory unit 2.

It is to be noted that a block shown by the single dotted line 18 in FIG. 1 represents an address control means for the read-only memory 13 whereas a block represented by the broken line 20 represents the clock phase modulating means.

While the time axis correcting device according to the present invention is so constructed as hereinabove described, it operates in the following manner.

The input video signal having its time axis varying is applied through the input terminal 10 to both of the analog-to-digital converter 1 and the sync separating circuit 6. Upon receipt of the input video signal, the sync separating circuit 6 separates a horizontal synchronizing signal from the input video signal. The horizontal synchronizing signal so separated is in turn applied to both of the memory write-in control circuit 9 and the burst sampling circuit 7. The memory write-in control circuit 9 then generates a write-in address for the memory unit 2 so that the address can be reset in synchronism with the horizontal synchronizing signal to perform a time axis correction for each horizontal scanning period. On the other hand, the burst sampling circuit 7 extracts sampling values of the burst signal at a predetermined interval subsequent to the receipt of the horizontal synchronizing signal, which values are subsequently supplied to the calculating circuit 8.

In the calculating circuit 8, the difference in phase between the sampling points and the reference position of the sampling point is calculated according to the previously described method. After this calculation, the calculating circuit 8 outputs a phase difference signal. The phase difference signal is then supplied to the adder 15 at which the phase difference signal is summed together with the reference address signal generated from the address generator 14 on the basis of the reference clock signal.

The read-only memory 13 has been programmed to store data obtained by sampling a sine wave at a predetermined interval, for example at equal interval. By way of example, the sampling points in the case where 16 sampling points are sampled during one cycle of the sine wave, respective values of which are sequentially written in the read-only memory 13, are such as shown in FIG. 2, and numerals affixed to the respective sampling points shown in FIG. 2 correspond to addresses.

Figure 2:
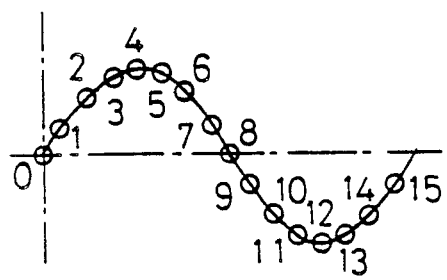
FIG. 2 illustrates a waveform representing sampling values of a sine wave adapted to be written in a read-only memory.
Figure 3:
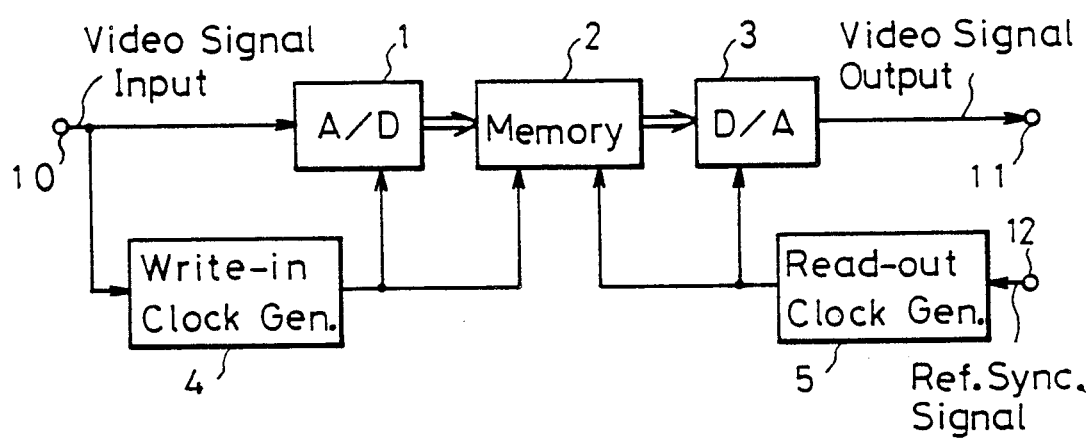
FIG. 3 is a block circuit diagram of the prior art time axis correcting device.
Figure 4:
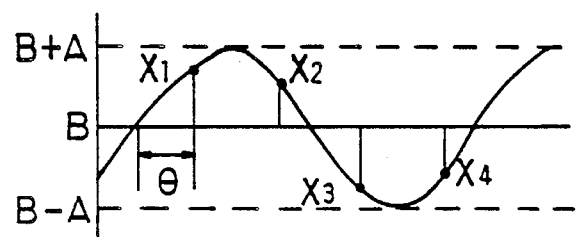
FIG. 4 illustrates a waveform of a signal used to explain the manner by which the phase of a sampling clock signal is calculated.
Figure 5:
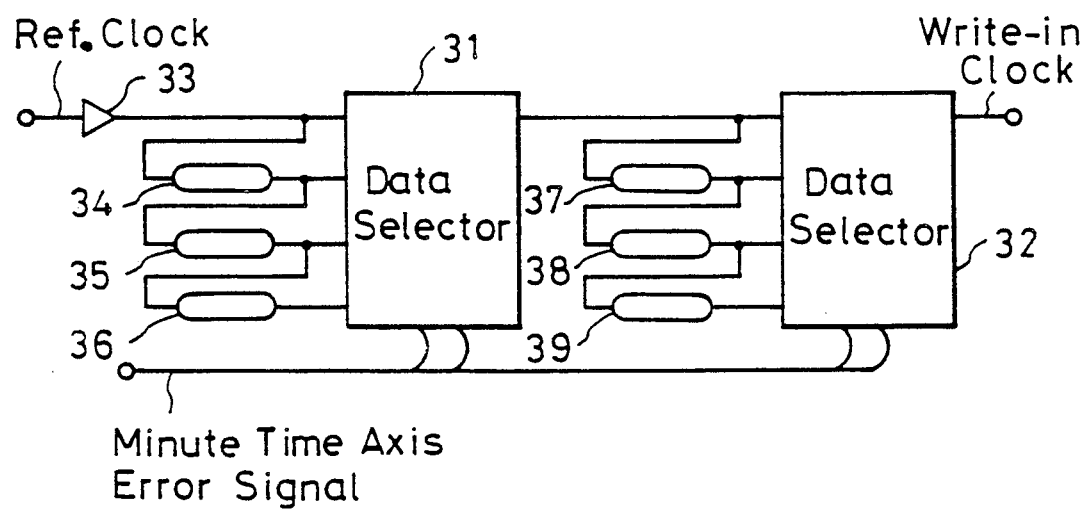
FIG. 5 is a block circuit diagram showing the prior art clock phase modulating means.

In the example shown in FIG. 2, addresses of the read-only memory are designated 0 to 15, and arrangement has been made that the address generator 14 can generate a numerical value varying in four stages at four address intervals, that is, 0, 4, 8 and 12. Assuming that the output from the calculating circuit 8 is fixed and the output from the address generator 14 is caused to vary in the four stages, the output from the adder 15 is supplied to the read-only memory 13 as four stage address signals, and the read-only memory 13 then outputs data of the four sampling points during each cycle of the sine wave. When the data outputted from the read-only memory 13 is converted by the digital-to-analog converter 12 into an analog sine wave and is subsequently shaped to represent a rectangular wave, the sampling command signal, that is, the sampling clock signal, having its phase varying in accordance with the value of the output from the calculating circuit 8, can be obtained.

Since while the output from the calculating circuit 8 is rendered zero the waveform of the burst signal is sampled, the amount of difference in phase associated with the change in time axis can be calculated, the change of the output of the calculating circuit 8 from zero to the result of the calculation will result in change of the phase of the sampling clock signal, outputted from the digital-to-analog converter 12, in pursuit of the change in time axis. Accordingly, if, with the sampling clock signal from the digital-to-analog converter 12 used as a clock input of the converter 1 and the control circuit 9, the input video signal is converted into the digital signal and the memory write-in control is executed, followed by the memory read-out control by the control circuit 17 in dependence on the reference clock signal from the reference clock generator 16 and also by the digital-to-analog conversion at the converter 3, the video signal whose change in time axis has been corrected can be obtained. It is, however, to be noted that the address generator 14 must be supplied with a clock signal of a frequency four times the frequency of the sampling clock signal so that the address generated thereby can be varied in synchronism with this clock signal.

In the example shown in FIG. 2, 1/16 clock is a minimum interval for the time axis correction. However, if the read-only memory 13 is supplied with data with finely sampled values of the sine wave, correction is possible at smaller time steps.

Also, the reference clock signal to be supplied to the address generator 14 may not be limited to the one having a frequency four times the frequency of the sampling clock signal. In the practice of the present invention, the reference clock signal may have a frequency which may be n-times the frequency of the sampling clock signal wherein n represents an integer not smaller than 3. Where the reference clock signal has a frequency eight times the frequency of the sampling clock signal, the address generator 14 has to be so arranged as to generate addresses of 0, 2, 4, 8, 10, 12 and 14 in sequence in correspondence with the sampling values of the sine wave shown in FIG. 2.

From the foregoing description of the present invention, it is clear that, by the process of calculating the phase difference of the reference signal from the sampled values obtained by sampling the reference signal, reading out the sampling data of the sine wave from the read-only memory and effecting the digital-to-analog conversion of the sampling data of the sine wave, the sampling clock signal or the sampling command signal following the change in time axis of the input video signal can be obtained. Therefore, the highly precise phase modulation of the sampling clock signal is possible with no adjustment required, and therefore, accurate time axis correction can be accomplished.

Although the present invention has fully been described in connection with the preferred embodiments thereof with reference to the accompanying drawings used only for the purpose of illustration, those skilled in the art will readily conceive numerous changes and modifications within the framework of obviousness upon the reading of the specification herein presented in regard to the present invention. Accordingly, such changes and modifications are, unless they depart from the spirit and scope of the present invention as delivered from the claims annexed hereto, to be construed as included therein.

We claim:

1. A time axis correcting device comprising:
   video signal storage means;
   write-in control means, operable in response to a sampling command signal, for writing an input video signal in said video signal storage means at a write-in timing conforming to a change in time axis of said input video signal;
   read-out control means, coupled to said video signal storage means, for reading out a stored video signal from said video signal storage means at a predetermined read-out timing;
   waveform storage means for storing sampling data obtained by sampling a reference sine wave at predetermined intervals;
   reference signal sampling means for sampling a reference signal separated from said input video signal;
   address control means for calculating a difference in phase between a sampling point and a reference position of said sampling point according to a sampling value of said reference signal sampled from said input video signal and also for addressing said waveform storage means according to said difference in phase to cause said waveform storage means to output said sampling data of said reference sine wave at each sampling timing;
   signal converting means for converting said sampling data of said reference sine wave into said sampling command signal; and
   sync separator means for separating a horizontal synchronizing signal from said input video signal, said reference signal sampling means being operable in response to said horizontal synchronizing signal to sample said reference signal at predetermined intervals from said horizontal synchronizing signal.

2. The time axis correcting device as claimed in claim 1, said horizontal synchronizing signal is applied, as a reset signal, to said write-in control means for resetting said write-in control means.

3. The time axis correcting device as claimed in claim 1, said reference signal is a color burst signal.

4. The time axis correcting device as claimed in claim 1, said address control means comprises a calculating circuit for calculating said difference in phase and for providing a phase difference signal indicative of said difference in phase, an address generator for generating a reference address signal, and an adder for summing said phase difference signal from said calculating circuit and said reference address signal to provide an address signal to be applied to said waveform storage means.

5. The time axis correcting device as claimed in claim 4, further comprising a reference clock generator for setting a predetermined read-out timing for said read-out control means and also for setting a timing at which said reference address signal is generated from said address generator.

6. The time axis correcting device as claimed in claim 1, said waveform storage means comprises a read-only memory for storing said reference sine wave in the form of digital data.

7. The time axis correcting device as claimed in claim 6, said signal converting means comprises a digital-to-analog converter.

8. A time axis correcting apparatus comprising:
   analog to digital converting means, coupled to an input video signal with varying time axis, for outputting a digital video signal;
   video signal storage means, coupled to said analog to digital converting means, for storing said digital video signal;
   synchronizing signal separation means, coupled to said input video signal, for separating a synchronization signal from said input video signal;
   write-in control means, coupled to said synchronizing signal separation means, for controlling a write-in operation of said digital video signal into said video signal storage means under control of a sampling clock signal;
   first digital to analog converting means, coupled to said video signal storage means, for converting said stored digital video signal into a converted video signal;
   read-out control means, coupled to said video signal storage means and said first digital to analog converting means, for controlling a read-out operation of said stored digital video signal into said first digital to analog converting means at a predetermined read-out timing; and
   clock phase modulation means, coupled to said synchronizing signal separation means and said analog to digital converting means, for generating said sampling clock signal to control said write-in control means to direct said write-in operation, which along with said read-out operation, controls the time axis correcting apparatus so that the time axis of said converted video signal is corrected, said clock phase modulation means including
      sampling means, coupled to said analog to digital converting means, for generating a sampled digital video signal component under timing control of said synchronization signal,
      waveform storage means for storing sampling data obtained by sampling a predetermined reference sine wave at predetermined intervals and for outputting said sampling data as said sampling clock signal, and
      address control means, coupled to said sampling means and said waveform storage means, for calculating a difference in phase between a sampling point of said sampled digital video signal component and a reference point thereof and for addressing said waveform storage means according to said difference in phase to direct output of said sampling clock signal.

9. The time axis correcting apparatus of claim 8, said address control means comprising:
   calculating means, coupled to said sampling means, for generating a difference signal;
   address generator means for generating a reference address; and
   adder means, coupled to said calculating means and said address generator means, for adding said difference signal and said reference address to output said difference in phase.

10. The time axis correcting apparatus of claim 9, said clock phase modulation means further comprising:
   second digital to analog converting means, coupled to said waveform storage means, for analog converting said sampling data to said sampling clock signal.

11. The time axis correcting apparatus of claim 10, further comprising:
   reference clock means, coupled to said read-out control means and said address generator means, for setting said predetermined read-out timing and for setting a timing at which said address generator means generates said reference address.

12. The time axis correcting apparatus of claim 8, said synchronization signal is a horizontal scanning signal.

13. The time axis correcting apparatus of claim 12, said write-in control means generates a write-in address for said video signal storage means to perform a time axis correction for each horizontal scanning period.

14. A time axis correcting apparatus comprising:
   analog to digital converting means, coupled to an input video signal with varying time axis, for converting said input video signal into a digital video signal;
   video signal storage means, coupled to said analog to digital converting means, for storing said digital video signal;
   digital to analog converting means, coupled to said video signal storage means, for converting said stored digital video signal into a converted video signal with corrected time axis; and
   timing control means, coupled to said analog to digital converting means, said video signal storage means and said digital to analog converting means for controlling a write-in operation of said digital video signal into said video signal storage means and a read-out operation of said stored digital video signal into said digital to analog converting means to direct generation of said converted video signal, said timing control means comprising
   sampling means, coupled to said analog to digital converter, for generating a sampled digital video signal component under timing control of a synchronization signal separated from said input video signal,
   waveform storage means for storing sampling data obtained by sampling a predetermined reference sine wave at predetermined intervals and for outputting said sampling data as a sampling clock signal,
   address control means, coupled to said sampling means and said waveform storage means, for calculating a difference in phase between a sampling point of said sampled digital video signal component and a reference point thereof and for addressing said waveform storage means according to said difference in phase to direct output of said sampling clock signal, and
   timing means, coupled to said analog to digital converting means, said video signal storage means and said digital to analog converting means for controlling said write-in operation and said read-out operation according to said sampling clock signal and a reference clock.

15. The time axis correcting apparatus of claim 14, said address control means comprising:
   calculating means, coupled to said sampling means, for generating a difference signal;
   address generator means for generating a reference address; and
   adder means, coupled to said calculating means and said address generator means, for adding said difference signal and said reference address to output said difference in phase.

16. The time axis correcting apparatus of claim 15, said timing control means further comprising:
   second digital to analog converting means, coupled to said waveform storage means, for analog converting said sampling data into said sampling clock signal.

17. A method of controlling a time axis correcting apparatus comprising
   analog to digital converting means, coupled to an input video signal with varying time axis, for converting said input video signal into a digital video signal,
   video signal storage means, coupled to said analog to digital converting means, for storing said digital video signal, and
   digital to analog converting means, coupled to said video signal storage means, for converting said stored digital video signal into a converted video signal with corrected time axis, said method comprising:
   sampling said input video signal under timing control of a synchronization signal separated from said input video signal to generate a sampled digital video signal component;
   storing sampling data of a predetermined reference sine wave in memory means;
   calculating a difference in phase between a sampling point of said sampled digital video signal component and a reference point thereof in a calculation means;
   addressing said memory means and outputting a sampling clock signal from said memory means based upon said difference in phase;
   directing a write-in operation of said video signal storage means according to said sampling clock signal; and
   reading out said stored digital video signal written into said video signal storage means during said write-in operation in accordance with a reference clock to generate said converted video signal with corrected time axis.

18. The method of controlling a time axis correcting apparatus of claim 17, said addressing step further comprising:
   generating a reference address in an address generator, adding said generated reference address to said difference in phase, and addressing said memory means based upon said added signal.

* * * * *